(No Model.)
E. BRESLAUER.
FURNACE GRATE.
No. 299,616. Patented June 3, 1884.
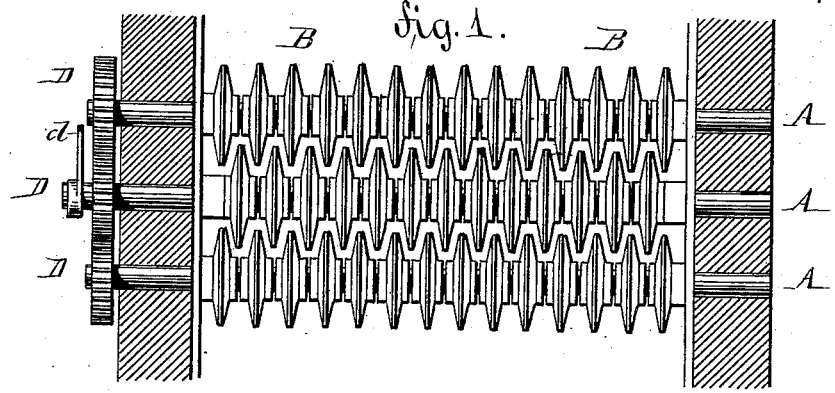
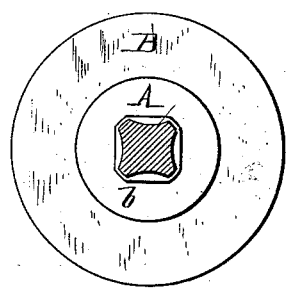
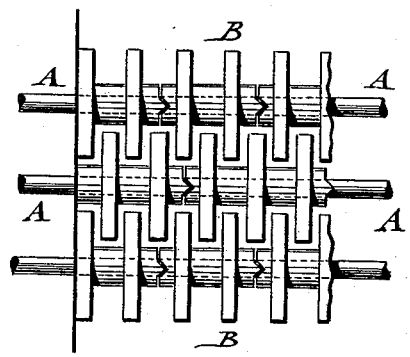
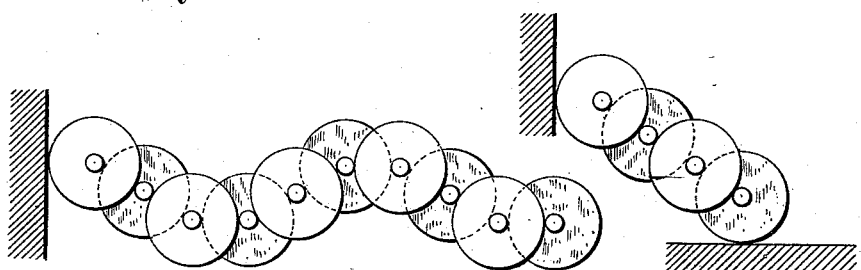
WITNESSES:
Jol. W. Rosenbaum
Otto Riech
INVENTOR
Eduard Breslauer
BY
Gopel & Raegener
ATTORNEYS.

UNITED STATES PATENT OFFICE.

EDUARD BRESLAUER, OF BERLIN, GERMANY.

FURNACE-GRATE.

SPECIFICATION forming part of Letters Patent No. 299,616, dated June 3, 1884.

Application filed September 6, 1883. (No model.)

*To all whom it may concern:*

Be it known that I, EDUARD BRESLAUER, of the city of Berlin and Empire of Germany, have invented certain new and useful Improvements in Furnace-Grates, of which the following is a specification.

This invention relates to furnace-grates composed of a series of rotary parallel shafts, each shaft having a series of disks.

The object of the invention is to provide a grate of this character which will preserve a comparatively even and uniform surface in whatever position the shafts may be turned.

In the accompanying drawings, Figure 1 is a plan or top view of a grate constructed in accordance with this improvement. Fig. 2 is a transverse section of one of the shafts, showing the disks thereon. Fig. 3 is a plain view of a section of a grate constructed in accordance with this invention, the hubs of the disks being made to interlock. Fig. 4 shows an undulating grate constructed in accordance with this invention. Fig. 5 represents an inclined grate of this character.

Similar letters of reference indicate corresponding parts.

In the drawings, A represents a shaft, the ends of which rest in bearings of the furnace-walls, and which is provided with a number of disks, B, that are keyed thereto. The disks B are provided at the center with abutments $b$ at both sides, by which the shaft A is inclosed and protected, and also a space formed between two adjoining disks. These spaces are increased by the disks being tapered or beveled from their hubs towards their peripheries. The disks B are made of metal, fire-clay, or other fire-proof material, and of a circular form. The disks may be made separately or several may be made in one piece. The disks of one shaft extend into the space between the disks of the adjoining shaft, whereby an open space of zigzag shape is formed between the disks, as shown. On the outer end of each shaft a gear-wheel, D, is applied that meshes with gear-wheels D of the next adjoining shafts, so that all the shafts and the disks placed thereon are moved by turning or oscillating one of the gear-wheels with a hand-lever, $d$.

In Fig. 3 the shafts A are secured rigidly to the walls, while the disks are made movable thereon by means of sleeves having interlocking projections. The disks are turned by means of the poker.

In Figs. 4 and 5 grates with an undulating and inclined arrangement of grate-bars are shown.

The interlocking of the disks secures a comparatively even grate-surface, with ample facility for the supply and distribution of air, and the disks being circular, the surface of the grate is not changed by the rotation thereof.

Having thus described my invention, I claim as new and desire to secure by Letters Patent—

1. The combination of a series of rotary shafts, each shaft provided with a series of removable circular disks beveled from their hubs to their peripheries, and having projecting separating hubs, the disks of one series extending into the spaces between the disks of adjoining series, and means for rotating said shafts, substantially as described.

2. The combination of a series of fixed shafts and independent separable disks movable on said shafts, said disks being provided with projecting hubs having interlocking recesses and projections, substantially as described.

In testimony that I claim the foregoing as my invention I have signed my name in presence of two subscribing witnesses.

EDUARD BRESLAUER.

Witnesses:
EMIL CAPITAINE,
B. ROI.